United States Patent

[11] 3,566,112

[72] Inventor Kurt Luecke
 Morillenhang 80, 51 Aachen, Germany
[21] Appl. No. 749,425
[22] Filed Aug. 1, 1968
[45] Patented Feb. 23, 1971
[32] Priority Aug. 5, 1967
[33] Germany
[31] P 15 72 719.2

[54] X-RAY GONIOMETERS PROVIDING INDEPENDENT CONTROL OF THREE ROTARY MOTIONS AND ONE RECIPROCATING MOTION
9 Claims, 5 Drawing Figs.

[52] U.S. Cl. ............................................. 250/51.5
[51] Int. Cl. ....................................... G01n 23/20;
 H01j37/20
[50] Field of Search ........................................ 250/51.5

[56] References Cited
UNITED STATES PATENTS
2,559,972 7/1951 Kirkpatrick ................ 250/51.5
2,798,957 7/1957 Holden et al. ................ 250/51.5
3,189,741 6/1965 Patser .......................... 250/51.5

OTHER REFERENCES
" Computer Controlled Diffractometer," Cole et al. The Review of Scientific Instruments, Vol. 34, No. 8, August, 1963, pp. 872—876 class 250/51.5

Primary Examiner—Archie R. Borchelt
Assistant Examiner—C. E. Church
Attorney—Edwin E. Greigg ABSTRACT: In an X-ray goniometer an apparatus comprising a specimen holder, a first motor to move the holder in a linear reciprocating path parallel to the specimen face exposed to the X-rays, a second motor to rotate said holder about an X-axis normal to said face and passing through the center of said specimen, a third motor to rotate said holder about a Y-axis normal to said X-axis and lying in the plane defined by the incident and diffracted X-rays and a fourth motor to rotate said holder about a Z-axis normal to said plane and passing through said specimen; all four motors are adapted to be controlled independently of one another.

3,566,112

Inventor
Karl Lücke
Adam E. Greigg

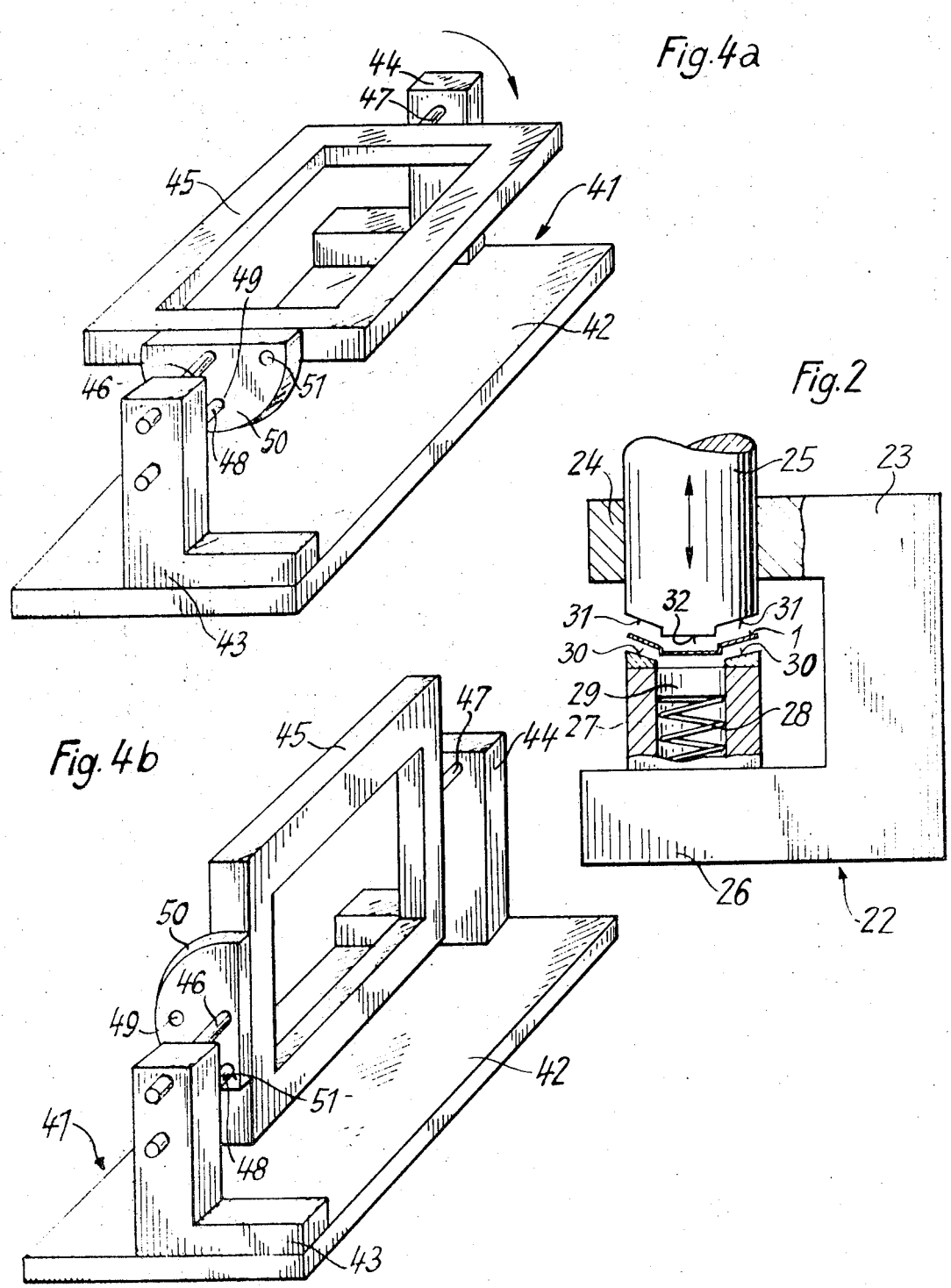

3,566,112

X-RAY GONIOMETERS PROVIDING INDEPENDENT CONTROL OF THREE ROTARY MOTIONS AND ONE RECIPROCATING MOTION

BACKGROUND OF THE INVENTION

The invention relates to an apparatus for the rapid determination of the complete polar configuration of the texture of crystalline specimens by means of measuring both the reflected and transmitted X-rays diffracted by certain crystal-lattice planes of the specimens.

Apparatuses for the determination of the directions of X-rays scattered by a specimen for the purpose of determining its texture are known in the art. In simpler devices of this type the specimen face scanned by the X-ray has a dimension identical to that of the image of the X-ray formed on the specimen. In more elaborate apparatus, the specimen is submitted to a reciprocating motion parallel with the plane of the specimen for the purpose of scanning a larger specimen face than the image of the X-ray beam on the specimen. In general, during this reciprocating motion effected by means of suitable mechanical devices, the specimen is, after each stroke, rotated through a small angle about an axis normal to the face of the specimen and passing through the center thereof. This axis will hereinafter be denoted as axis X. The specimen is also rotated about another axis (hereinafter referred to as axis Y) which is normal to the axis X and lies in a plane defined by the incident and diffracted X-ray. If the rotation about axis Y is performed slowly simultaneously with the azimuthal rotation about axis X, a spiral scanning of the specimen results. If, on the other hand, the specimen is rotated manually or by means of a mechanical or electrical relay through a predetermined angle about axis Y only after each full azimuthal rotation, a scanning of the specimen in concentric azimuthal circles results. For the sensing of transmitted X-rays, the rotation about axis X is omitted and, instead, the specimen is rotated after each stroke through a small angle about axis Y. In known X-ray goniometers after a full revolution of the specimen about axis Y, the specimen, if transmitted X-rays are sensed, has to be rotated through a small angle —corresponding to the angle about axis Y for the examination of the reflected rays —about an axis (hereinafter denoted as axis Z) which is normal to the plane defined by the incident and diffracted X-rays and which passes through the specimen.

In known X-ray goniometers of this type the reciprocating motion and the rotary motion about the three axes are all or in part connected to one another or they have to be effected manually so that an arbitrary control of each individual motion or desired combinations thereof, e.g., by means of a computer, is not possible due to the structure of the goniometer. For the sensing process of transmitted X-rays —if this is at all possible —an additional assistant is required for rotating the specimen about axis Z.

OBJECT AND SUMMARY OF THE INVENTION

The invention purports to avoid the aforenoted disadvantages in that the reciprocating motion and the rotary motions about axes X, Y and Z may be controlled electrically, individually and independently of one another.

Briefly stated, according to the invention there is provided a first motor to move a specimen holder in a linear reciprocating path, a second motor to rotate said holder about the afore-defined X-axis, a ring surrounding said holder and having a normal axis coinciding with the afore-defined Y-axis, a third motor to rotate said ring and said holder as a unit about said Y-axis, a circular frame surrounding said ring and containing in its plane the afore-defined Z-axis, a fourth motor to rotate said circular frame and said holder as a unit about said Z-axis. All four motors are adapted to be controlled independently of one another.

The invention will be better understood, as well as further objects and advantages will become more apparent, from the ensuing detailed specification taken in conjunction with the drawings.

BRIEF DESCRIPTION OF THE DRAWINGS

FIG. 2 is a schematic, partly sectional, side elevational view of a stamping device for the preparation of a specimen;

FIGS. 4a and 4b are isometric views of another embodiment of a specimen holder shown in two different operating positions.

DESCRIPTION OF A PREFERRED EMBODIMENT FOR MOVING THE SPECIMEN

Figure 1:
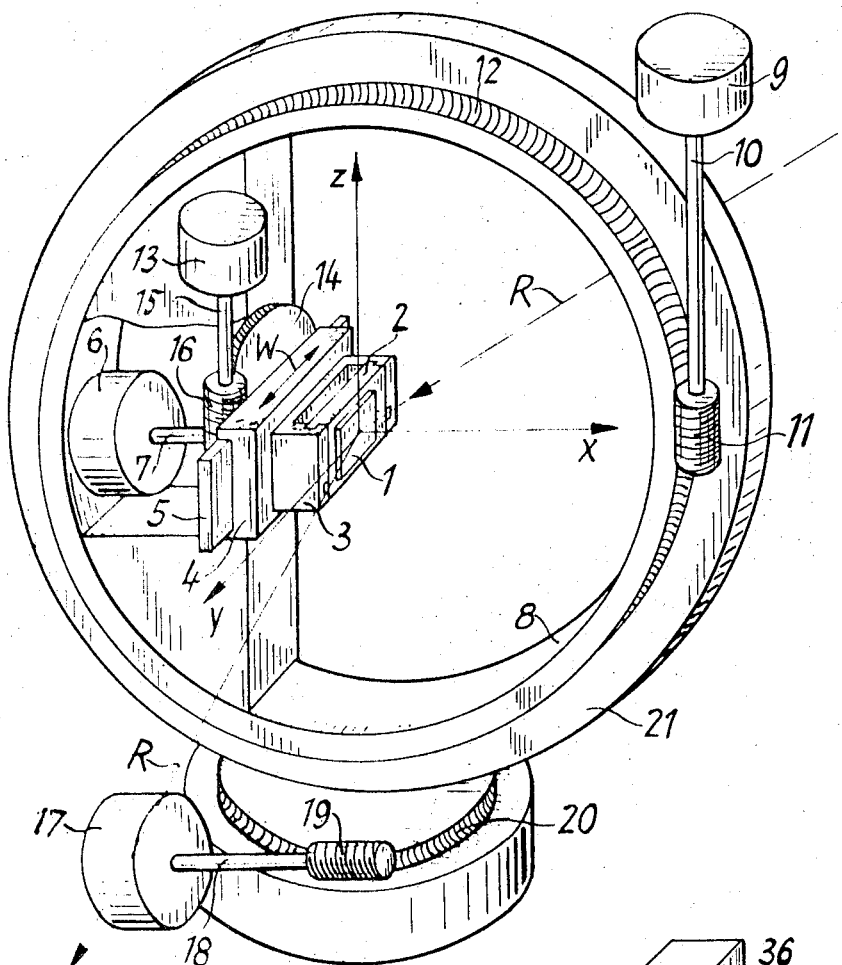
FIG. 1 is a schematic isometric view of an embodiment according to the invention.

Turning now to FIG. 1, there is shown a specimen 1 fitted into a frame 2 which, in turn, is secured to a holder 3. A carriage 4, to which holder 3 is affixed, is mounted on a guide rail 5 and is adapted to reciprocate thereon in the direction of arrow W parallel with the specimen face directed outwardly from frame 2. The length of the strokes the carriage 4 may perform with the specimen 1 along guide rail 5 may be selected from between a zero value and a distance depending upon the dimensions of the apparatus. The aforenoted reciprocating motion is effected by means of a mechanism comprising a motor 6 which drives, through a shaft 7, an eccentric (not shown) disposed inside the carriage 4.

In known devices the scanning of the specimen 1 is performed in a starlike manner; that is, in different azimuthal positions different areas of the specimen 1 are sensed. In the case of nonhomogeneous textures or small specimens 1 which are often encountered in practice, such scanning results in erroneous measurements. This type of scanning process, however, is unavoidable in known apparatus since the carriage 4 when executing the strokes indicated by arrow W has to follow the rotational movement about axis X.

According to the invention, on the other hand, at all times the same striplike area of the specimen 1 is scanned. The angle of incidence of the X-ray R emitted by an X-ray tube (not shown) and adapted to scan the specimen 1 remains constant with respect to axis Y. The assembly described hereinbefore (the specimen holder, the motor 6, etc.) is surrounded and supported by a ring 8 which is rotatable about its normal axis, coinciding with axis Y, by a motor 9 through a shaft 10, a worm gear 11, and a ring gear 12 disposed peripherally about ring 8. Simultaneously, the carriage 4 performs its rotational movements about axis X by virtue of a motor 13 (also secured inside ring 8) driving a gear 14 through a shaft 15 and a worm gear 16.

The rotations about axis Z are effected by a motor 17 which, through a shaft 18 and a worm gear 19, rotates a gear 20 secured to a circular frame 21. Within frame 21 there is disposed the ring 8 which, together with the assembly supporting the specimen 1, may rotate with respect to frame 21 about axis Y and with frame 21 about axis Z. The latter lies in the plane of frame 21 and extends through the center thereof.

The motors 6, 9, 13 and 17 may be controlled independently of one another or may be coordinated in any combination by means of a computer to effect a programmed control of the reciprocating motion along arrow W and the rotary motions about axes X, Y and Z.

DESCRIPTION OF AN EXEMPLARY MODE OF OPERATION

During a stroke in a direction along arrow W, rail 5 is rotated about axis X through 0.5° so that for a full revolution of the guide rail 5 through 360° about axis X, 720 strokes are executed. In order to avoid too rapid strokes, the motor 6, driving the eccentric (not shown), is down-geared 2:1 which means that the motor 13 rotating the guide rail 5 about axis X has to be down-geared 720:1 since both motors 6 and 13 have to run synchronously. A cam (not shown) is secured to the guide rail 5 in such a manner that after a full revolution of the rail about axis X, the cam trips a relay (not shown) energizing the motor 9 to rotate ring 8 and specimen 1 as a unit about axis Y through 5°. The motor 9, too, is down-geared to a ratio 720:1 since it assumes the function of the motor 13 when transmitted X-rays are observed. After a full revolution of the vertical ring 8 about the axis Y, a cam (not shown) secured thereto actuates a contact (not shown) which starts the motor 17 for a 5° rotation of frame 21, ring 8 and specimen 1 about axis Z.

APPARATUS FOR PREPARING THE SPECIMEN

In order to take advantage of an operating speed which is a multiple of that of known X-ray goniometers, the specimen 1 is, for the purpose of rendering it more rigid, deformed prior to placing it in the goniometer. For this purpose there is provided, as shown in FIG. 2, a stamping device generally indicated at 22. It comprises a U-shaped bracket 23 through the upper leg 24 of which there is guided a punch 25 having a rectangular cross section. Under the punch 25, secured to the lower leg 26 of the bracket 23 there is disposed a die 27 in the inside of which there is contained a spring 28 urging a base plate 29 upward. The upper edges of the die 27 are chamfered as shown at 30. The end face of the punch 25 is similarly chamfered as shown at 31, from a central protrusion 32 which fits into the opening of the die 27.

TWO EMBODIMENTS OF THE SPECIMEN HOLDER

Figure 3:
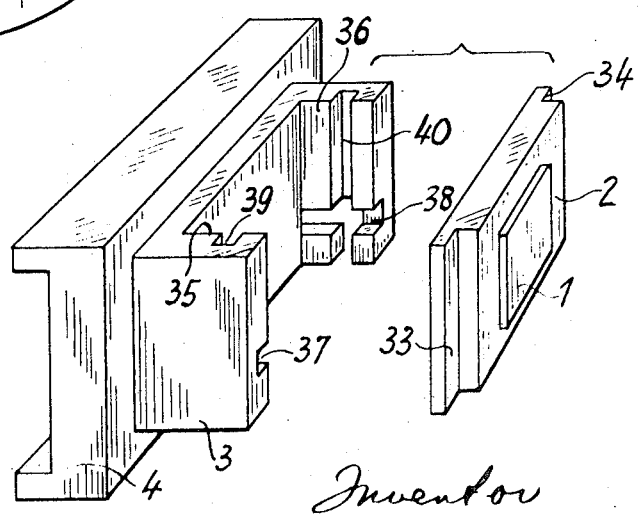
FIG. 3 is an isometric view of a specimen holder according to the invention.

Turning now to FIG. 3, the specimen 1, deformed as shown in FIG. 2, is press fitted into frame 2 and adjusted. The frame 2, the small sides of which are formed as guide edges 33 and 34, may be inserted into the U-shaped holder 3 which itself is secured to the carriage 4. The inner faces 35 and 36 of the two opposed upstanding sides of the holder 3 are provided with a first pair of parallel grooves 37, 38 and a second pair of parallel grooves 39, 40 arranged normal to the first pair. The groove pairs 37, 38 and 39, 40 are adapted to selectively receive the guide edges 33, 34 of frame 2. For measuring the X-rays transmitted by specimen 1, the frame 2 is inserted into the groove pair 37, 38, while for sensing reflected rays, the frame 2 is positioned in the groove pair 39, 40.

Referring now to FIGS. 4a and 4b, there is shown a device generally indicated at 41 which is another embodiment of the holder for the specimen frame 2. The device 41 comprises a base plate 42 to which there are secured two angle members 43 and 44. One leg of each angle member 43, 44 extends normal to the base plate 42, while the respective other legs point in opposite directions with respect to one another and are secured to base plate 42. The specimen holder 45 is rotatably mounted on the upstanding legs of the angle members by means of stub shafts 46 and 47 and may be immobilized by means of pin 48. The specimen frame 2 is inserted into the rectangular opening of the specimen holder 45. In the position shown in FIG. 4a the device is set for measurements of reflected X-rays, whereas in the position shown in FIG. 4b the transmitted rays may be sensed. In order to arrive from the former position to the latter, the pin 48 is withdrawn from the hole 49 which is provided in a circular disc 50 fixedly secured to the specimen holder 45; then the specimen holder is rotated 90° and the pin 48 is inserted into a second hole 51 in the disc 34.

I claim:
1. In an X-ray goniometer for determining the complete polar configuration of the texture of a crystalline specimen by sensing the reflected and transmitted X-rays diffracted by certain crystal lattices of said specimen after impinging on one face thereof, the improvement comprising:
  A. a first means for imparting a linear reciprocating motion to said specimen parallel to said face thereof;
  B. a second means for imparting a rotation to said specimen solely about an X-axis normal to said face and through the center of said specimen;
  C. a third means for imparting a rotation to said specimen solely about a Y-axis normal to said X-axis and contained in a plane defined by the impinging and diffracted X-rays; and
  D. a fourth means for imparting a rotation of said specimen solely about a Z-axis normal to said plane and lying on said face of said specimen, said first, second, third and fourth means being simultaneously operable individually and independently of one another.

2. The improvement as defined in claim 1, wherein said first, second, third and fourth means each includes an independently controllable motor.

3. The improvement as defined in claim 2, including a ring surrounding and supporting said specimen, said first and said second means; said ring has a normal axis coinciding with said Y-axis; said ring and said specimen are rotatable as a unit about said Y-axis by virtue of said motor associated with said third means.

4. The improvement as defined in claim 3, including a circular frame; said Z-axis extends diametrically with respect to said frame and passes through the center thereof; said frame, said ring and said specimen are rotatable as a unit about said Z-axis by virtue of said motor associated with said fourth means.

5. The improvement as defined in claim 1, including a holder means for fixedly supporting said specimen during operation.

6. The improvement as defined in claim 5, wherein said holder means includes a frame directly engaging and holding said specimen and a holder receiving said frame with said specimen.

7. The improvement as defined in claim 6, wherein said holder includes means for selectively supporting said frame in either of two fixed, mutually perpendicular positions.

8. The improvement as defined in claim 7, wherein said holder includes two parallel spaced inner faces each provided with two pairs of grooves, one pair of grooves is perpendicular to the other pair, the grooves forming a pair are parallel to one another and are provided on one of each inner face, said frame is selectively insertable into one or the other said pair of grooves.

9. The improvement as defined in claim 7, wherein said holder is pivotally supported by a base and means are provided to immobilize said holder in either of said two positions.